UNITED STATES PATENT OFFICE.

LORETTA BARTON WELD, OF FALMOUTH, MASSACHUSETTS.

MEDICINAL PREPARATION.

SPECIFICATION forming part of Letters Patent No. 379,299, dated March 13, 1888.

Application filed January 28, 1887. Serial No. 225,801. (No specimens.)

*To all whom it may concern:*

Be it known that I, LORETTA BARTON WELD, a citizen of the United States, residing at Falmouth, Barnstable county, Massachusetts, have invented certain new and useful Improvements in Quinine Preparations, of which the following is a specification.

My invention is a preparation of quinine adapted for use alone or in conjunction with other medicaments or ingredients for medicinal purposes; and my preparation consists of a salt of quinine and chloride of sodium (common salt) combined as a dry mixture, ready for use and solution in a proper menstruum, as desired, so as to make a non-acid solution of quinine.

As is well known, a strong acid solution of quinine cannot be used medicinally for many purposes—as for local applications, injections, &c. I have found that when a salt of quinine is mixed with chloride of sodium in a dry state and then added to a suitable menstruum the reaction in the presence of such menstruum results in a non-acid solution of quinine, which may be made of great strength and which has no irritant qualities, so that it can be used for purposes for which it has not heretofore been practicable to employ strong quinine solutions.

In a separate application for Letters Patent No. 225,802, filed January 28, 1887, I have set forth a medicinal preparation consisting of a salt of quinine and salt (chloride of sodium) combined with alcohol and water in a clear non-acid solution. This is serviceable for many purposes; but in many instances it is not desirable or practicable to keep the material in the form of a solution, and often it is necessary to make the solutions with different menstrua. For these reasons the liquid preparation cannot be used in all cases, and I therefore combine the dry salts, as above set forth, forming a preparation which can be at any time added to the desired menstruum—as alcohol and water, whisky, sherry, &c.

As the preparation is in the form of a dry mixture, the solution may be made at will of any strength desired, and in any proportions and in any menstruum, as circumstances may require.

The proportions of the ingredients of the preparation will vary in accordance with the circumstances. Thus in some cases I combine two parts of sulphate of quinine in crystals or powder and one part of chloride of sodium.

Without limiting myself to any special proportions of ingredients, I claim—

A medicinal preparation consisting of a salt of quinine and chloride of sodium combined in a dry state for solution in a non-acid menstruum, substantially as described.

In testimony whereof I have signed my name to this specification in the presence of two subscribing witnesses.

LORETTA BARTON WELD.

Witnesses:
RICHARD H. BAKER, Jr.,
RUSSELL A. McCOY.